United States Patent [19]
Ono et al.

[11] Patent Number: 4,772,783
[45] Date of Patent: Sep. 20, 1988

[54] IC CARD READER/WRITER

[75] Inventors: Hirofumi Ono; Jirou Kino, both of Seto; Yuji Tsuchikawa, Owariasahi, all of Japan

[73] Assignee: Hitachi, Ltd., Tokyo, Japan

[21] Appl. No.: 84,458

[22] Filed: Aug. 11, 1987

[30] Foreign Application Priority Data

Aug. 13, 1986 [JP] Japan ............................... 61-188432

[51] Int. Cl.⁴ .............................................. G06K 19/06
[52] U.S. Cl. ...................................... 235/492; 235/380
[58] Field of Search ................................. 235/380, 492

[56] References Cited

U.S. PATENT DOCUMENTS 4,380,699 4/1983 Monnier et al. ..................... 238/492

Primary Examiner—Harold I. Pitts
Attorney, Agent, or Firm—Antonelli, Terry & Wands

[57] ABSTRACT

Since the IC card does not have a power source in an ordinary case, the power is supplied thereto from the IC card reader/writer via the contact electrode. According to the present invention, a current detect unit is disposed between the power source of the IC card reader/writer and the contact electrode for the power supply to detect the presence/absence of the current supply. A data signal can be delivered from the IC card reader/writer to the IC card only when the current supply is detected by the current detect unit so as to prevent the latch-up phenomenon due to an insufficient contact between the electrodes of the IC card particularly including a complementary MOS and the electrodes of the IC card reader/writer, thereby preventing the destruction of the IC card.

6 Claims, 2 Drawing Sheets

IC CARD READER/WRITER

BACKGROUND OF THE INVENTION

The present invention relates to an IC card reader/writer, and in particular, to an IC card reader/writer in which an electric circuit configuration to prevent a destruction of an IC card is integrated.

IC cards have been used for various purposes, for example, as a credit card. As the IC cards become to be broadly used, there has arisen a problem that the IC card is destructed because of various causes such as a static electric noise of a plastic used as a material of the IC card and a latch-up phenomenon due to an insufficient contact between the IC card and an IC card reader/writer.

Various countermeasurements have been devised to protect an integrated circuit (to be abbreviated as an IC herebelow) against the static electric noise of the plastic material; however, it has been difficult to prevent the latch-up phenomenon occurring in a complementary metal oxide semiconductor (MOS) predominantly used for the IC cards. The latch-up phenomenon is a phenomenon in which the signal input voltage of an IC card exceeds the power supply voltage and the IC chip is destroyed when the electric contact between the IC card and the IC card reader/writer is unstable.

SUMMARY OF THE INVENTION

It is therefore an object of the present invention to provide an IC card reader/writer capable of preventing the destruction of an IC card due to the latch-up phenomenon, thereby improving the problem described above.

In order to achieve the object, according to the present invention, there is provided an IC card reader/writer comprising a power source for supplying an electric current via a contact electrode of the IC card reader/writer to the IC card, current detect means disposed between the power source and the contact electrode for detecting the presence/absence of the current supply, and means responsive to a detection output from the current detect means for effecting a control to output a signal via the contact electrode to the IC card only when the current supply is present.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
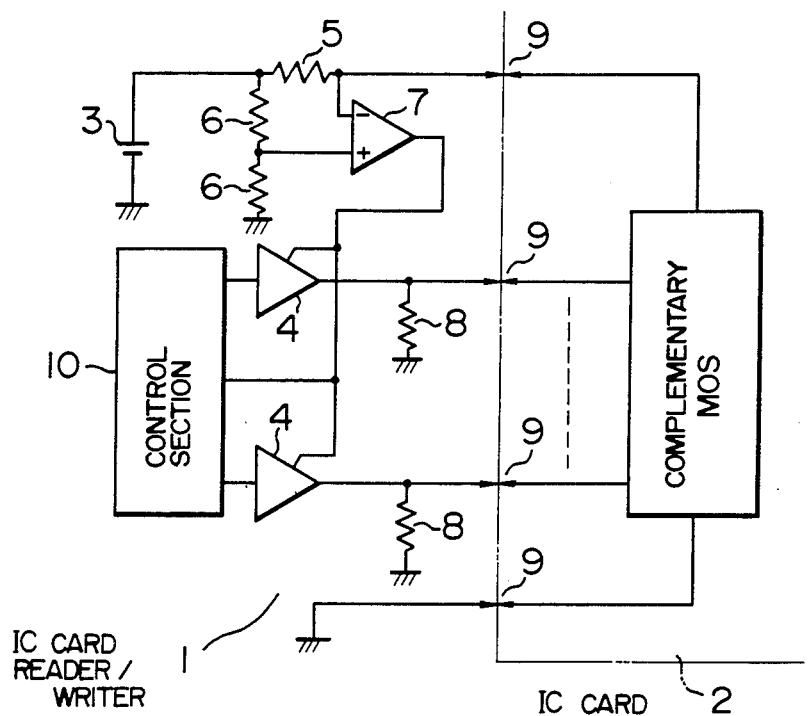
FIG. 1 is a schematic circuit diagram of the IC card reader/writer in an embodiment of the present invention.

Referring now to the drawings, an embodiment of the present invention will be described.

FIG. 1 is a schematic circuit diagram of an IC card reader/writer in an embodiment of the present invention. The IC card reader/writer 1 communicates with an IC card including a complementary MOS via contact sections 9. In the contact sections 9, a collect electrode of the IC card reader/writer is brought into contact with an electrode of an IC card. The IC card reader/writer 1 includes a power source 3, output buffers 4, a comparator 7, resistors 5, 6, and 8, and a control section 10.

The comparator 7 is connected via the resistors 5-6 to the power source 3 and via the contact sections 9 to the IC card; furthermore, an output terminal of the comparator 7 is connected to the output buffers 4. The output therefrom is set to a low level when the power source 3 is supplying a normal current via the contact sections 9 to the IC card 2, thereby transmitting an enable signal to the output buffers 4. When the power supply is interrupted due to an insufficient contact or the like occurring in the power source terminal or a ground terminal of the contact sections 9 and hence the ends of the resistor 5 are set to the same potential, the output from the comparator 7 is reversed and consequently the enable signal is not delivered.

The resistor 6 is connected between an input terminal of the comparator 7 and a ground line and between the input terminal and the power source 3 so as to provide a compare voltage with respect to an input voltage to another input terminal of the comparator 7. An end of the resistor 5 is connected to the power source 3, whereas another end thereof is linked to said another input terminal of the comparator 7 so as to supply the power via one of the contact sections 9 to the IC card 2. The constant value of the resistor 6 is set with consideration to a current consumption of the IC card 2 and a voltage drop in the resistor 5, which enables to limit the current value from the power source 3.

The output buffers 4 each have output terminal respectively connected via the contact section 9 to the IC card 2, and a resistor 8 is connected between the ground terminal and each said output buffer 4. A control terminal of each output buffer 4 is linked to the comparator 7 to receive an enable signal. On receiving an enable signal, each output buffer 4 opens a gate thereof to output a High or Low signal corresponding to the signal to the IC card 2 via the contact sections 9.

When the enable signal is off, the resistor 8 sets the signal line of each output buffer 4 to the ground level so as to prevent a wrong output which may occur because the output gate of the output buffer 4 is of a high impedance.

The control section 10 is connected to the input terminal of each output buffer 4 and outputs a data signal via the output buffer 4 and the contact sections 9 to the IC card 2. In addition, the control section 10 is also connected to the output terminal of the comparator 7 so as to detect an enable signal. Moreover, although the control section 10 controls mechanical operations such as the insertsion and ejection of the IC card 2 into and from the IC card reader/writer 1, such a control is not directly related to the present invention and hence the detailed description thereof will be omitted.

Figure 2:
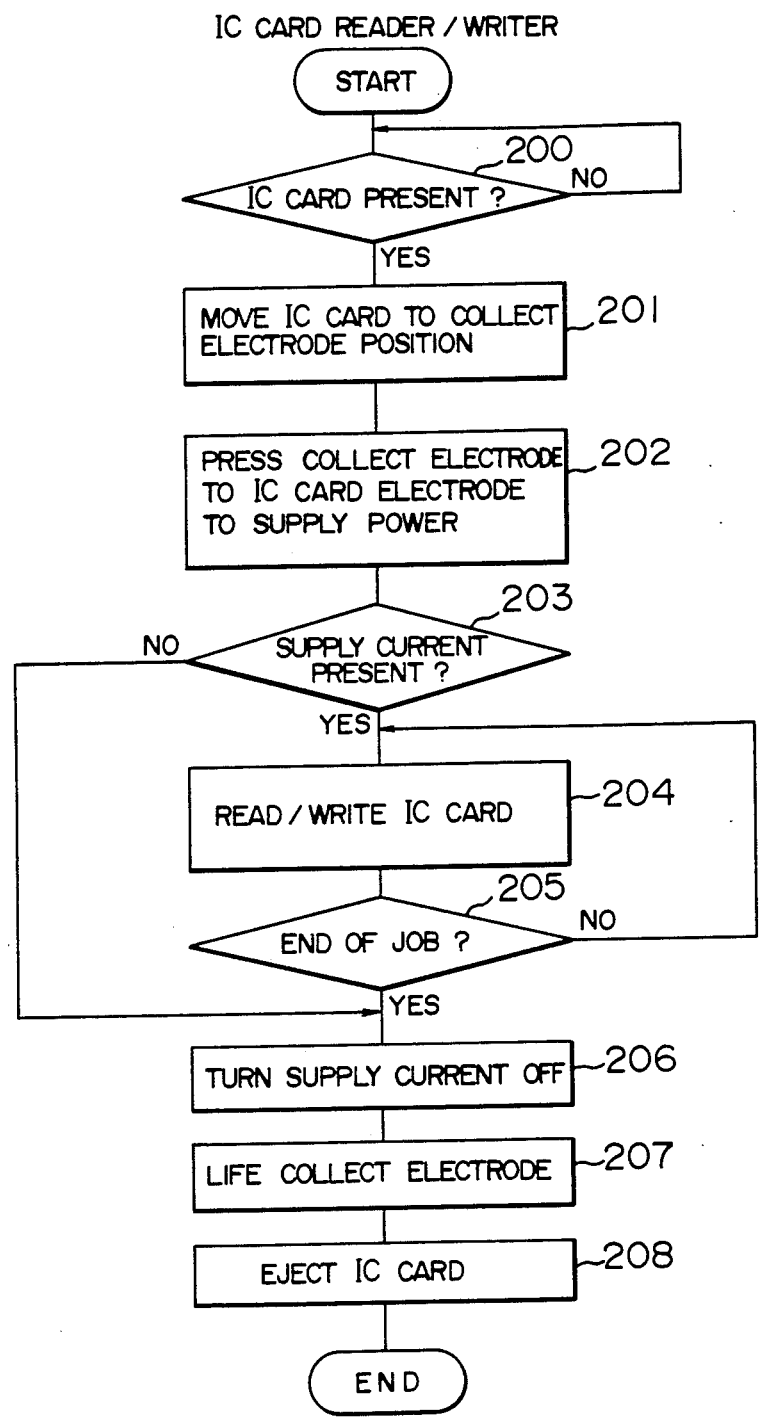
FIG. 2 is an operation flowchart of the IC card reader/writer in the embodiment of the present invention.

FIG. 2 is a flowchart illustrating operations of the IC card reader/writer in the embodiment of the present invention.

When an IC card is inserted into the IC card reader/writer 1 (200), the IC card reader/writer 1 moves the IC card 2 to a collect electrode position (201) so as to push the collect electrode downward, thereby supplying the power to the IC card 2 (202). An electric current flowing from the power source 3 enters via the resistors 5–6 to the comparator 7 and then the control section 10 detects the presence/absence of the current supplied to the IC card 2 (203).

When the current supply is not detected, namely, when the current does not normally flow into the IC card 2 and if a signal is outputted in this state, the signal voltage becomes to be higher than the power source voltage applied to the IC card 2 and the latch-up phenomenon is caused; in such a case, the IC card 2 is forcibly ejected (206, 207, 208).

When the supplied current is confirmed, the comparator 7 delivers an enable signal to each output buffer 4 to open the gate thereof and then a signal is fed to the IC card, thereby effecting such operations under control of the control section 10 as the read, write, and erase operations (204). After the operations are finished (205), the supply current is turned off (206), the collect electrode is lifted upward (207), and the IC card 2 is ejected (208).

As described above, the signal is outputted only when the current is normally supplied to the IC card 2 and the level of the power supply voltage is higher than that of the signal voltage; moreover, the IC card 2 is forcibly ejected when the flow of the supply current is absent; consequently, the IC chip can be protected against the destruction due to the latch-up phenomenon.

Incidentally, in the embodiment above, another current detecting element can also be used in place of the comparator 7. For example, the similar circuit can be constructed by use of a transistor, a thyristor, and the like.

Figure 3:
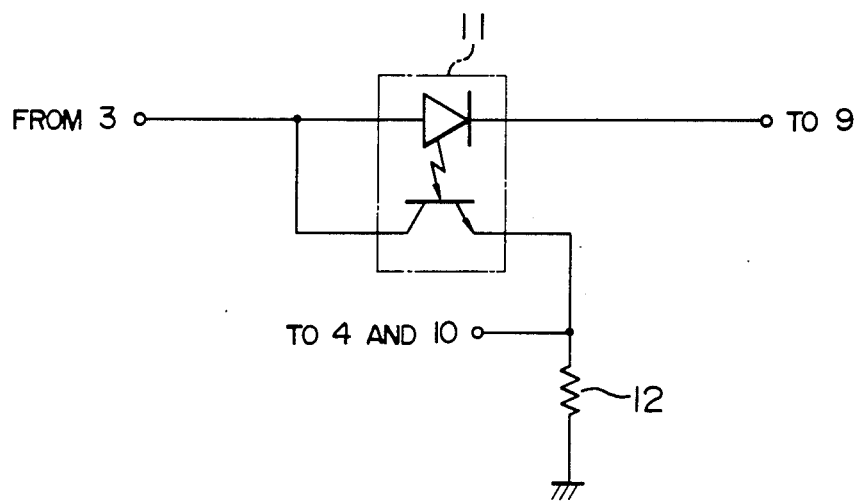
FIG. 3 is a schematic circuit diagram illustrating another embodiment in which a photointerrupter is used as a current detect element.

FIG. 3 is a schematic circuit diagram illustrating an example of a current detect circuit using a photointerrupter (or a photocoupler) 11. The photointerrupter 11 has a positive side and a collector side each directly connected to the power source 3. The emitter side thereof is linked via a resistor 12 to the ground so as to output an enable signal. When the supply current from the power supply 3 is absent, a transistor constituting the photointerrupter 11 is off and hence does not output the enable signal. When a supply current of about 5–10 mA flows from the power supply 3, the transistor of the photointerrupter turns on and delivers the enable signal.

In addition, also for the power source 3, the value of the power source current can be limited depending on the constant value of the resistor 6. Furthermore, the power source 3 may be dedicated to the IC card 2 by considering the voltage drop in the resistor 5; alternatively, the power source 3 may be commonly used as a power source of the control section 10 of the IC card reader/writer 1 according to the allowable voltage value.

In accordance with the present invention, without necessitating to modify the IC card itself, the IC card can be protected against the destruction due to the latch-up phenomenon; as a consequence, the load of the production cost associated with the improvement of the system reliability can be reduced.

While the present invention has been described with reference to the particular illustrative embodiments, it is not restricted by those embodiments but only by the appended claims. It is to be appreciated that those skilled in the art can change or modify the embodiments without departing from the scope and spirit of the invention.

What is claimed is:

1. An IC card reader/writer having contact electrodes disposed therein so as to be brought into contact respectively with a plurality of electrodes of an IC card inserted thereinto comprising:
   a power source for supplying a current via the contact electrode to the IC card;
   current detect means disposed between the power source and the contact electrode to be supplied with the current for detecting the presence/absence of a current supply; and
   control means responsive to a detection output from said current detect means for outputting a signal via the contact electrode to the IC card only when the current supply is present.

2. An IC card reader/writer according to claim 1 wherein said current detect means includes a comparator comparing a voltage drop associated with the supply current flowing through a resistor with a compare voltage.

3. An IC card reader/writer according to Claim 1 wherein said current detect means comprises a photointerrupter which switches into an ON state in response to the supply current.

4. An IC card reader/writer according to claim 1 wherein said control means includes a buffer gate receiving as inputs thereto the detection output and the output signal.

5. An IC card reader/writer according to claim 1 further including a complementary MOS which is supplied with power from the power source and which receives the signal output as an input signal thereto.

6. An IC card reader/writer according to claim 1 wherein the IC card is forcibly ejected when the current supply is not detected.

* * * * *